(12) United States Patent
Takami

(10) Patent No.: US 9,172,825 B2
(45) Date of Patent: Oct. 27, 2015

(54) DATA OUTPUT APPARATUS, DATA OUTPUT SYSTEM, AND DATA OUTPUT CONTROL METHOD FOR PREVENTING LEAKAGE OF PERSONAL INFORMATION

(71) Applicant: Kana Takami, Kanagawa (JP)

(72) Inventor: Kana Takami, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/536,995

(22) Filed: Nov. 10, 2014

(65) Prior Publication Data

US 2015/0131122 A1    May 14, 2015

(30) Foreign Application Priority Data

Nov. 11, 2013 (JP) .................................. 2013-233407
May 7, 2014 (JP) .................................. 2014-096179

(51) Int. Cl.
| | |
|---|---|
| G06F 15/00 | (2006.01) |
| G06K 1/00 | (2006.01) |
| G06F 3/12 | (2006.01) |
| H04N 1/00 | (2006.01) |
| G06K 15/00 | (2006.01) |
| H04N 1/21 | (2006.01) |
| H04N 1/44 | (2006.01) |

(52) U.S. Cl.
CPC .......... *H04N 1/00068* (2013.01); *G06K 15/005* (2013.01); *G06K 15/4095* (2013.01); *H04N 1/00076* (2013.01); *H04N 1/00408* (2013.01); *H04N 1/21* (2013.01); *H04N 1/44* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 5,579,447 A | * | 11/1996 | Salgado .......................... | 358/1.9 |
| 5,706,411 A | * | 1/1998 | McCormick et al. ......... | 358/1.14 |
| 6,945,718 B2 | * | 9/2005 | Hirose ............................ | 400/76 |
| 7,258,498 B2 | * | 8/2007 | Hatta et al. ..................... | 400/62 |
| 7,304,753 B1 | * | 12/2007 | Richter et al. ................. | 358/1.15 |
| 7,394,558 B2 | * | 7/2008 | Stringham .................... | 358/1.15 |
| 7,609,404 B2 | * | 10/2009 | Nakahashi .................... | 358/1.15 |
| 8,446,621 B2 | * | 5/2013 | Nuggehalli et al. .......... | 358/1.15 |
| 2005/0052659 A1 | * | 3/2005 | Jacobsen et al. ............... | 358/1.1 |
| 2008/0180703 A1 | * | 7/2008 | Yamada ......................... | 358/1.9 |
| 2009/0095813 A1 | * | 4/2009 | Chang et al. .................. | 235/385 |
| 2013/0182272 A1 | * | 7/2013 | Lim .............................. | 358/1.13 |
| 2013/0322946 A1 | * | 12/2013 | Okada .......................... | 400/582 |

FOREIGN PATENT DOCUMENTS

| | | |
|---|---|---|
| JP | 5175810 | 1/2013 |
| JP | 2013-095118 | 5/2013 |

\* cited by examiner

*Primary Examiner* — Ming Hon
(74) *Attorney, Agent, or Firm* — Oblon, McClelland, Maier & Neustadt, L.L.P.

(57) ABSTRACT

An image forming apparatus Gk of a data output system includes a data output time calculation function unit that calculates a predicted output time necessary for outputting data to be output in a specified output form by a data output function unit which outputs the data to be output in the specified output form, and a control function unit that compares the predicted output time with a predetermined threshold time and controls displaying of display data, which is stored in a storage function unit, onto a display function unit.

9 Claims, 13 Drawing Sheets

FIG.4

| USER ID | USER NAME | PASSWORD |
|---|---|---|
| 1 | guest1 | - |
| 2 | guest2 | - |
| 3 | user1 | abc |
| 4 | user2 | 123 |

FIG.5

| ID | NAME OF FILE TO BE OUTPUT | NAME OF DISPLAY FILE | STORAGE DESTINATION |
|---|---|---|---|
| 1 | ~ FUNCTION SPECIFICATION.xxx | ~ FUNCTION SPECIFICATION.doc | /user1 |
| 2 | ~ MINUTES.yyy | ~ MINUTES.pdf | /user2 |

FIG.6

| ID | LINK DESTINATION | NAME OF DISPLAY LINK | STORAGE DESTINATION |
|---|---|---|---|
| 1 | http://xxx.yyy.zzz | WHOLE COMPANY ~ GUIDE | /common |
| 2 | http://aaa.bbb.ccc | ~ HEAD OFFICE POLICY PRESENTATION GUIDE | /common |
| 3 | http://ddd.eee.fff | TODAY'S SCHEDULE | /user1 |

FIG.7

| | USER ID | TYPE OF REGISTRATION DATA | DATA ID |
|---|---|---|---|
| 1 | 1 | LINK | 1 |
| 2 | 2 | LINK | 1 |
| 3 | 2 | LINK | 2 |
| 4 | 3 | FILE | 1 |
| 5 | 3 | LINK | 3 |
| 6 | 3 | LINK | 1 |
| 7 | 3 | LINK | 2 |
| 8 | 4 | FILE | 2 |

FIG.13

|   | USER ID | TYPE OF REGISTRATION DATA | DATA ID | PERSONAL INFORMATION |
|---|---|---|---|---|
| 1 | 1 | LINK | 1 | NO |
| 2 | 2 | LINK | 1 | NO |
| 3 | 2 | LINK | 2 | NO |
| 4 | 3 | FILE | 1 | YES |
| 5 | 3 | LINK | 3 | YES |
| 6 | 3 | LINK | 1 | NO |
| 7 | 3 | LINK | 2 | NO |
| 8 | 4 | FILE | 2 | YES |

DATA OUTPUT APPARATUS, DATA OUTPUT SYSTEM, AND DATA OUTPUT CONTROL METHOD FOR PREVENTING LEAKAGE OF PERSONAL INFORMATION

CROSS-REFERENCE TO RELATED APPLICATIONS

The present application claims priority to and incorporates by reference the entire contents of Japanese Patent Application No. 2013-233407 filed in Japan on Nov. 11, 2013 and Japanese Patent Application No. 2014-096179 filed in Japan on May 7, 2014.

BACKGROUND OF THE INVENTION

1. Field of the Invention

The present invention relates to a data output apparatus, a data output system, and a data output control method and specifically relates to a data output apparatus, a data output system, and a data output control method which prevent leakage of personal information and utilize a waiting time for data output effectively.

2. Description of the Related Art

In an image forming apparatus such as a printer apparatus, a copying apparatus, or a composite apparatus, when copy processing or print processing is performed, there is a case where a user waits for completion of printing in front of the image forming apparatus to prevent leakage of confidential information due to a printed material being taken away.

Also, recently, the image forming apparatus is connected to a network and performs print output, on paper, of data received from a host apparatus such as a computer through the network.

An image forming apparatus connected to such a network generally includes an image accumulation memory such as a hard disk and performs print output after temporarily accumulating received data into the image accumulation memory. Then, in respect to data which requires confidentiality (hereinafter, arbitrarily referred to as confidential data), conventionally, the image forming apparatus adds, as user identification information, a user ID, a PIN code, or the like to the confidential data and accumulates the confidential data into the image accumulation memory of the image forming apparatus. The image forming apparatus requests input of the user identification information in respect to print output of the confidential data. When input user identification information matches the user identification information added to the confidential data or matches user identification information of a registered user registered as a user in the image forming apparatus in advance, the image forming apparatus performs print output of the confidential data.

Then, as described above, when print output of the confidential data is performed in the image forming apparatus, a user needs to wait for completion of the print output in front of the image forming apparatus and has to waste a waiting time.

Then, conventionally, an image forming apparatus including: a data transmission/reception unit configured to receive display data associated with either or both of user information and image data to be printed; a storage unit configured to store received display data while associating the received display data with the user information or the image data; an input unit configured to input a print request and user information; a display unit configured to display the display data; and a control unit configured to read, when printing image data to be printed according to the input print request, display data associated with the printed image data, or display data associated with the input user information from the storage unit and to display the read display data on the display unit has been proposed (see, for example, Japanese Laid-open Patent Application No. 2011-28437).

That is, the related technology tries to utilize effectively a waiting time by displaying, on the display unit, display data related to image data being currently printed or a user during the printing.

SUMMARY OF THE INVENTION

It is an object of the present invention to at least partially solve the problems in the conventional technology. The present invention provides a data output apparatus including a data output unit configured to output data to be output; an output time calculation unit configured to calculate a predicted output time necessary for outputting the data to be output; a storage unit which stores display data; a display unit configured to perform display output of the display data in the storage unit; a display control unit configured to compare the predicted output time with a predetermined threshold time and to control displaying of the display data onto the display unit. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table illustrating an example of user authentication information;

FIG. 5 is a table illustrating an example of a database in a case of storing data to be output and display data in a file format;

FIG. 6 is a table illustrating an example of a database in a case of storing display data in a link format;

FIG. 7 is a table illustrating an example of an association database between a user and data;

FIG. 13 is a table illustrating an example of an association database of the third embodiment;

DETAILED DESCRIPTION OF THE PREFERRED EMBODIMENTS

In the following, preferred embodiments of the present invention will be described in detail based on the attached drawings. Note that the embodiments described in the following are preferred embodiments of the present invention. Thus, various limitations preferred technically are added. However, a scope of the present invention is not limited to the following description. Also, all configurations described in the present embodiment are not essential components of the present invention.

First Embodiment

Figure 1:
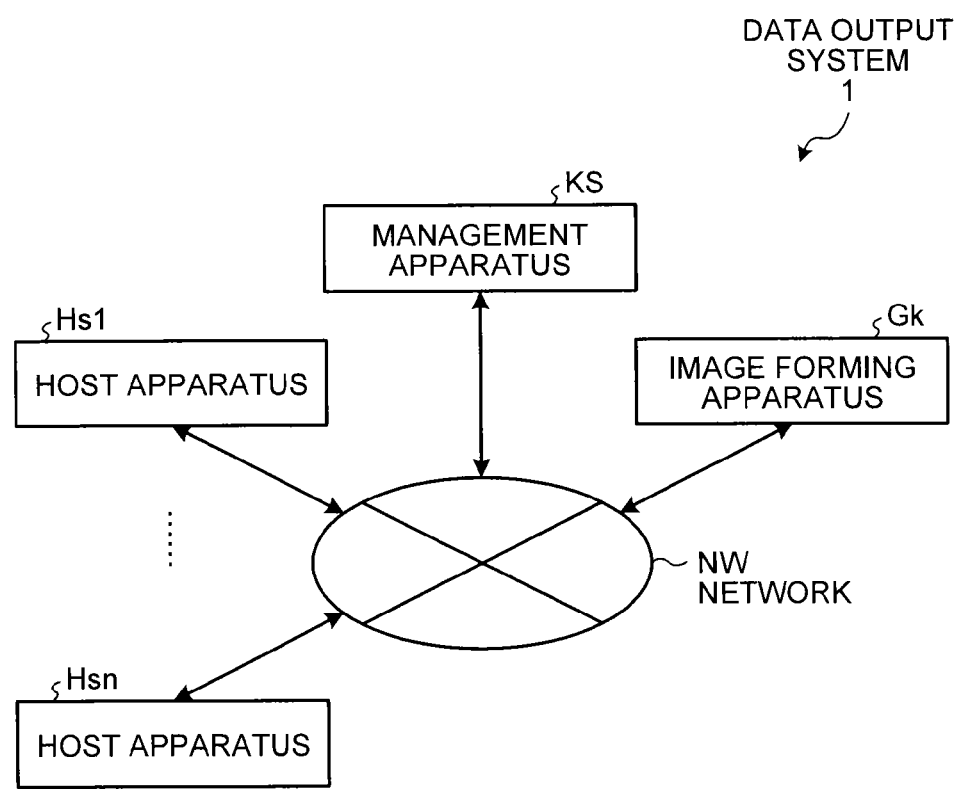
FIG. 1 is a configuration diagram of a data output system to which a first embodiment of the present invention is applied.

FIG. 1 to FIG. 8 are charts illustrating a data output system of the first embodiment of the present invention. FIG. 1 is a configuration diagram of a data output system 1 to which the data output apparatus, the data output system, the data output control method, and the data output control program of the first embodiment of the present invention are applied.

In FIG. 1, in the data output system 1, an image forming apparatus Gk and a plurality of host apparatuses Hs1 to Hsn (n≥2) are connected to a network NW. The network NW may be any kind of network as long as a print job including data to be output (such as image data) and output condition information, data output result information, and the like can be transmitted/received by communication such as local area network (LAN), or the Internet. The output condition information at least specifies an output time of the data to be output. The network NW is a network to perform at least either of wired communication and wireless communication. Note that in FIG. 1, only one image forming apparatus Gk is illustrated. However, a plurality of image forming apparatuses Gk may be connected.

As each of the host apparatuses Hs1 to Hsn, for example, a personal computer including an ordinary hardware configuration is used. Each of the host apparatuses Hs1 to Hsn includes, for example, a control unit, an internal storage unit, a user interface (I/F), and a communication I/F. The internal storage unit includes a nonvolatile memory such as a hard disk or a non volatile RAM (NVRAM), and a volatile memory. The nonvolatile memory of the internal storage unit stores software which is, for example, an operating system (OS), various applications, or a data output control program, and various kinds of data such as data to be output. The data output control program makes processing, which is a part of a data output control method of the present invention and which is executed by the host apparatuses Hs1 to Hsn, executed. The volatile memory of the internal storage unit is mainly used as a work memory of the control unit. The user I/F is, for example, a display, a keyboard, or a mouse. With the user I/F, a user inputs an instruction to the host apparatuses Hs1 to Hsn, and the user I/F outputs various kinds of information notified from the host apparatuses Hs1 to Hsn to the user. The communication I/F is connected to the network NW and transmits/receives a print job or various kinds of data through the network NW. The control unit includes a device such as a central processing unit (CPU), or a random access memory (RAM). Based on a program in the internal storage unit, the control unit executes basic processing as the host apparatuses Hs1 to Hsn and executes processing to be executed in the host apparatuses Hs1 to Hsn among data output control processing of the present invention which will be described later.

Figure 2:
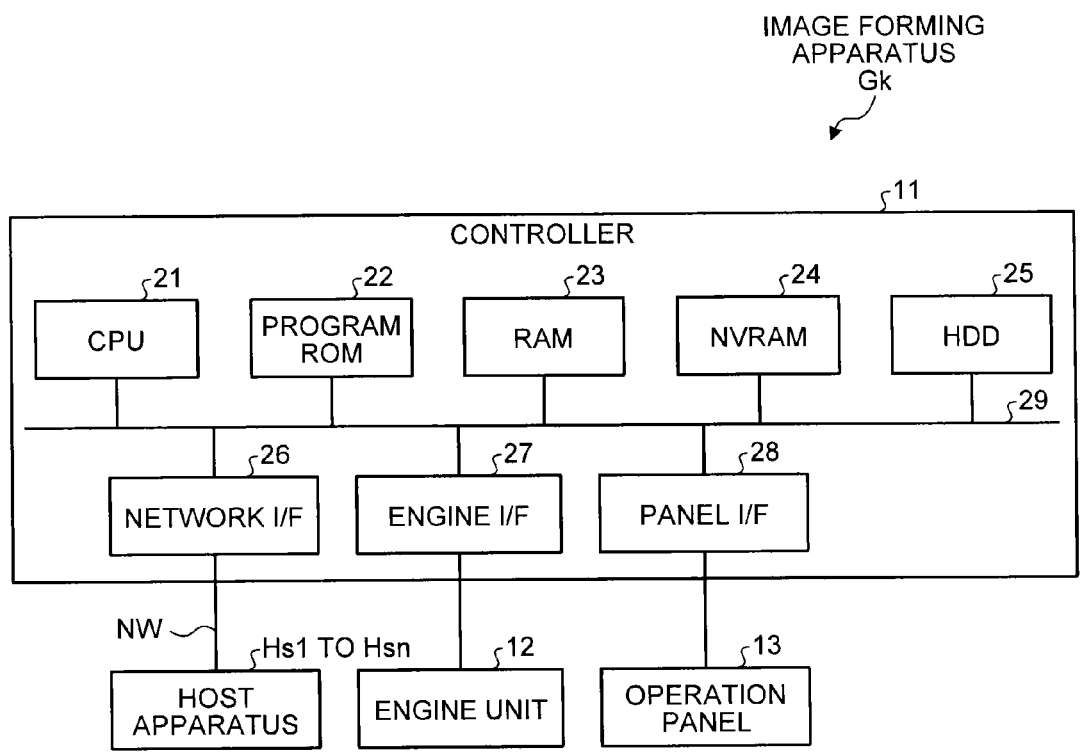
FIG. 2 is a block configuration diagram of an image forming apparatus.

The image forming apparatus (data output apparatus) Gk is a data output apparatus of a composite apparatus, a printer apparatus, a copying apparatus, or the like. The image forming apparatus includes, for example, an image forming function, a data distribution function, a scanner function, and a copying function. As illustrated in FIG. 2, the image forming apparatus includes a hardware configuration. That is, the image forming apparatus Gk includes a controller 11, an engine unit 12, an operation panel 13, and the like.

The controller 11 includes a central processing unit (CPU) 21, a program read only memory (ROM) 22, a random access memory (RAM) 23, a non-volatile random access memory (NVRAM) 24, a hard disk (HDD) 25, a network interface (I/F) 26, an engine I/F 27, a panel I/F 28, and the like being connected to each other through a bus 29. Note that the controller 11 includes a clocking unit to clock time such as current time, although not illustrated. As described later, the controller 11 performs data output control processing accompanied by display control processing of display data by using a clocking function of the clocking unit.

To the network I/F 26, the host apparatuses Hs1 to Hsn are connected through the network NW. The network I/F 26 is an interface to receive a print job including a control signal, data (data to be output, method of outputting data to be output, output condition information to specify output time), and the like transmitted from the host apparatuses Hs1 to Hsn and to deliver a status signal and the like transmitted from the image forming apparatus Gk to the host apparatuses Hs1 to Hsn. Specifically, the network I/F 26 receives, from the host apparatuses Hs1 to Hsn, a print job including output condition information and data to be output and transmits completion notification of the print job to the host apparatuses Hs1 to Hsn. Also, according to a distribution request of data to be output received from the host apparatuses Hs1 to Hsn, the CPU 21 distributes the data to be output to a distributing destination such as different host apparatuses Hs1 to Hsn by using the network I/F 26.

The program ROM 22 stores a program to process or manage data in the controller 11 and to control a peripheral module. Specifically, the program ROM 22 stores various programs such as a basic processing program as the image forming apparatus Gk, and a data output control program which executes the data output control method of the present invention which method tries to reduce possibility of leakage of personal information and to utilize effectively a waiting time during data output. The program ROM 22 also stores various kinds of data necessary for executing each program.

Based on the programs stored in the program ROM 22, the CPU 21 performs data output processing such as image forming processing (hereinafter, also referred to as print processing, appropriately), data distribution output processing, and data transfer output processing and executes the data output control method, which will be described later, by controlling each part of the image forming apparatus Gk while using the RAM 23 as a work memory.

The RAM 23 is used as a work memory of the CPU 21 and is also used, for example, as a buffer to manage, in a page unit, print data from the host apparatuses Hs1 to Hsn and to store the data temporarily and as a bit map memory in which the data stored into the buffer is converted into drawing data suitable for actual printing and is expanded. The RAM 23 includes a capacity to accumulate a plurality of pages of the print data, drawing data converted from the print data, or intermediate data.

The NVRAM 24 is a memory to hold stored contents even when the image forming apparatus Gk is turned off. In the NVRAM 24, data which is to be held even when the image forming apparatus Gk is turned off is stored under control by the CPU 21. Specifically, various kinds of data necessary for the data output control processing, which will be described later, such as a threshold time set in the operation panel 13 or in the host apparatuses Hs1 to Hsn, an engine characteristic parameter indicating an engine characteristic of the engine unit 12 (such as redness being deep), and an output specification in data output such as data transmission speed are stored.

The hard disk 25 accumulates data such as expanded print data, a print job transmitted from the host apparatuses Hs1 to Hsn, or the like under the control by the CPU 21, these pieces of data being also read therefrom under the control by the CPU 21. Specifically, the hard disk 25 stores a print job to which output condition information is added, other print jobs and the like transmitted from the host apparatuses Hs1 to Hsn.

To the engine I/F 27, the engine unit 12 is connected. The engine I/F 27 transmits/receives a control signal or drawing data from the controller 11 to the engine unit 12, and a status signal from the engine unit 12 to the controller 11.

The engine unit 12 includes a printer engine, a scanner engine, and the like. As the printer engine, for example, a printer engine of an electrophotographic printer, an ink-jet printer, or the like is used. Based on drawing data and a control signal, the printer engine performs print output (image forming output) of an image on paper (image forming medium) fed from a paper feeding unit and ejects the printed paper to a paper tray. The drawing data is converted from print data, which is transmitted from the host apparatuses Hs1 to Hsn and received by the network I/F 26, and is transmitted from the engine I/F 27. That is, although not illustrated, in a case of an electrophotographic engine, the printer engine includes a part necessary for performing print processing on paper by an electrophotographic method based on drawing data. For example, the printer engine includes an image forming unit including a photoreceptor, a charging unit, an optical writing unit, a developing unit, a transfer unit, a cleaning unit, and the like. In a case where the printer engine is a color printer engine, the image forming unit is included for each color, for example, for each of CMYK. The printer engine makes the optical writing unit operate by the drawing data and the control signal, forms an electrostatic latent image on the photoreceptor uniformly charged by the charging unit, performs developing by supplying toner on the photoreceptor by the developing unit, and forms a toner image. The printer engine performs print processing by feeding paper between the photoreceptor and the transfer unit from the paper feeding unit, transferring, by the transfer unit, the toner image on the photoreceptor to the paper, conveying the paper, to which the toner image is transferred, to a fixing unit, and fixing the toner image on the paper by heating/pressing in the fixing unit. Also, after performing main-scanning and sub-scanning on a document in which an image is recorded and performing photoelectric conversion of the image of the document by a photoelectric conversion element such as a charge coupled device (CCD) or a complementary metal oxide semiconductor (CMOS), the scanner engine converts the image into binary image data and outputs the data to the CPU 21 through the engine I/F 27.

To the panel I/F 28, the operation panel 13 is connected. The panel I/F 28 transmits/receives a signal between the CPU 21 and the operation panel 13.

The operation panel 13 includes various operation keys such as a numeric keypad, a start key, and a mode selection key to select a mode and also includes a display unit such as a liquid crystal display with a touch panel. With the operation panel 13, various instructions of a print operation and the like are input by a key operation of the operation key or a touch operation of the display unit. Specifically, a user name, a password, a data output condition, a threshold time, and the like necessary for the data output control processing which will be described later are input. The operation panel 13 displays, on the display unit, instruction contents input with the operation key, various kinds of information notified from the image forming apparatus Gk to a user, an image to be processed, and the like.

The image forming apparatus Gk is configured as an image forming apparatus which executes the data output control method, which will be described later, to reduce possibility of leakage of personal information and to utilize a waiting time during data output by reading the data output control program which executes the data output control method of the present invention, which program is stored in a computer-readable recording medium, and by installing the program into the program ROM 22, the hard disk 25, and the like. The recording medium is, for example, a ROM, an electrically erasable and programmable read only memory (EEPROM), an EPROM, a flash memory, a flexible disk, a compact disc read only memory (CD-ROM), a compact disc rewritable (CD-RW), a digital versatile disk (DVD), a secure digital (SD) card, or a magneto-optical disc (MO). The data output control program is a program which is described in legacy programming language or object oriented programming language such as assembler, C, C++, C#, or Java (R) and can be executed by a computer. The program can be stored into the above described recording medium and distributed.

Figure 3:
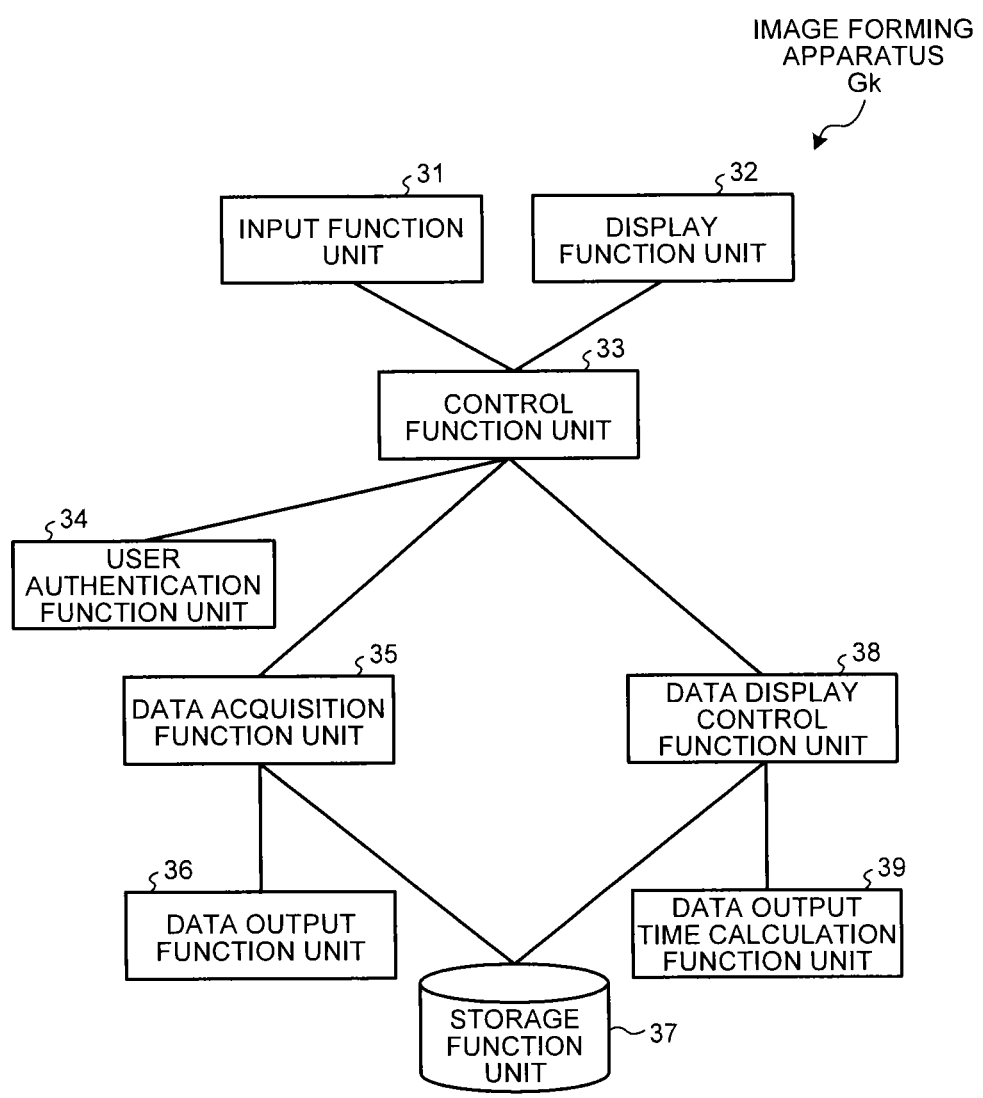
FIG. 3 is a functional block diagram of the image forming apparatus.

In the image forming apparatus Gk, by the data output control program being installed and executed, a function block illustrated in FIG. 3 is built. That is, by the data output control program being installed, in the image forming apparatus Gk, an input function unit 31, a display function unit 32, a control function unit 33, a user authentication function unit 34, a data acquisition function unit 35, a data output function unit 36, a storage function unit 37, a data display control function unit 38, a data output time calculation function unit 39, and the like are built.

The input function unit 31 is built, for example, by the operation key of the operation panel 13 or the touch panel of the display. With the input function unit 31, a user performs an input operation of an output condition in data output of data to be output. The output condition is, for example, an output form such as print output, distribution output, or transfer output, a threshold time, or other output conditions (such as print condition, distribution condition such as distributing destination).

The display function unit (display unit) 32 is built, for example, by the display of the operation panel 13 and displays contents input from the input function unit 31, or various kinds of information notified from the image forming apparatus Gk to a user. Specifically, the display function unit 32 displays display data in the data output control processing of the present invention.

The control function unit 33 is built by the CPU 21. By controlling each function unit, the control function unit 33 controls data output processing (such as print output processing or distribution processing) and controls the data display control function unit 38 which will be described later, whereby the control function unit 33 executes the data output control method of the present embodiment.

The user authentication function unit 34 is built, for example, by the CPU and the NVRAM 24. The user authentication function unit 34 performs user authentication depending on whether user authentication information input from the input function unit 31 matches user authentication information stored into the NVRAM 24 in advance.

The data acquisition function unit 35 is built by the scanner engine of the engine unit 12 or the network I/F 26 and acquires data to be output. That is, in a case of a scanner engine, the data acquisition function unit 35 performs main-scanning and sub-scanning on a document and imports an image of the document as data to be output. Also, in a case of the network I/F 26, the data acquisition function unit 35 imports a print job transmitted from the host apparatuses Hs1 to Hsn as data to be output.

The data output function unit (data output unit) 36 is built, for example, by the printer engine of the engine unit 12 and the network I/F 26. The data output function unit 36 performs output processing of data to be output according to a specified output form such as print output, distribution output, or transfer output.

The storage function unit 37 is built, for example, by the hard disk 25. The storage function unit 37 stores the data to be output acquired by the data acquisition function unit 35, data related to the data to be output, display data related to the data to be output under the control by the control function unit 33, these pieces of data being also read therefrom under the control by the control function unit 33.

When user authentication information used by the user authentication function unit 34 is input from the input function unit 31 or the host apparatuses Hs1 to Hsn, the storage function unit (storage unit) 37 stores the information, for example, as user authentication information illustrated in FIG. 4 under the control by the control function unit 33. For example, as illustrated in FIG. 4, in the user authentication information, a pair of a user name and a password is associated with a user ID. Also, when storing display data in a file format, for example, as illustrated in FIG. 5, the storage function unit 37 stores the display data in a database format including a data ID, a name of a file to be output, a name of a display file, and a storage destination. Moreover, when storing the display data in a link format, for example, as illustrated in FIG. 6, the storage function unit 37 stores the display data in a database format including a link destination, a name of a display link, and a storage destination. Also, as illustrated in FIG. 7, the storage function unit 37 stores, as an association database, association data which associates a user and display data. As illustrated in FIG. 7, the association database is a database in which a user ID, a registration data type, and a data ID are associated with each other and registered. Here, the registration data type is a registration type of the display data and indicates a file format and a link format respectively illustrated in FIG. 5 and FIG. 6.

The data display control function unit 38 is built by the CPU 21. Under the control by the control function unit 33, the data display control function unit 38 performs output control of display data based on a predicted output time and a threshold time required to output data to be output. Then, the data display control function unit 38 acquires data to be output from the storage function unit 37 and requests the data output time calculation function unit 39 to calculate a predicted output time necessary for outputting the data to be output in a specified output form.

The data output time calculation function unit (example of output time calculation unit) 39 is built, for example, by the CPU 21. By using a data output specification stored into the NVRAM 24 or the like in advance, the data output time calculation function unit 39 calculates, based on an output time for a unit data quantity, a predicted output time necessary for outputting the data to be output, which is requested to calculate, in a specified output form. The data output time calculation function unit 39 transmits the calculated predicted output time to the data display control function unit 38. When an output form of the data output is print output, an output time for a unit data quantity is a print output speed (such as continuous printing speed in one minute) in a unit data quantity in the printer engine of the engine unit 12. The print output speed is determined in consideration of a size, resolution, and the like of the data to be output. Also, when the data output form is distribution output, a transmission time of the data to be output in a unit data quantity from the network I/F 26 to a specified distributing destination through the network NW is a transmission time for the unit data quantity. The transmission time is determined in consideration of a data type, a network type, a transmission path, network traffic, and the like of the output data.

Based on display control information of display data in the data display control function unit 38, the control function unit 33 controls displaying the display data onto the display function unit 32. That is, in the control function unit 33 and the data display control function unit 38, the data display control function unit 38 compares a predicted output time, which is calculated by the data output time calculation function unit 39, with a predetermined threshold time and the control function unit 33 controls displaying of the display data onto the display function unit 32 based on the comparison result. The control function unit 33 and the data display control function unit 38, as a whole, function as a display control unit.

Next, an effect of the present embodiment will be described. The image forming apparatus Gk of the data output system 1 of the present embodiment reduces possibility of leakage of personal information in output of data to be output and tries to utilize effectively a waiting time during the data output.

That is, in the data output system 1 of the present embodiment, the image forming apparatus Gk performs, with the printer engine of the engine unit 12, data output, such as print output or distribution output, of data to be output received from the host apparatuses Hs1 to Hsn or data to be output acquired by the scanner engine. In the data output system 1, a user previously registers display data into the storage function unit 37 of the image forming apparatus Gk or a different place on the network NW other than the image forming apparatus Gk. The place is, for example, the host apparatuses Hs1 to Hsn. Then, in the data output system 1, as illustrated in FIG. 5 and FIG. 6, a user stores, into the storage function unit 37, display data specification information to specify the display data in such a manner that a file name or a link name of the display data (display file) is stored. Also, as illustrated in FIG. 5 and FIG. 6, the user registers a name of a file to be output, a storage destination or a link destination, and a storage destination into the database in the storage function unit 37 while associating these with a file name or a link name of the display data.

Figure 8:
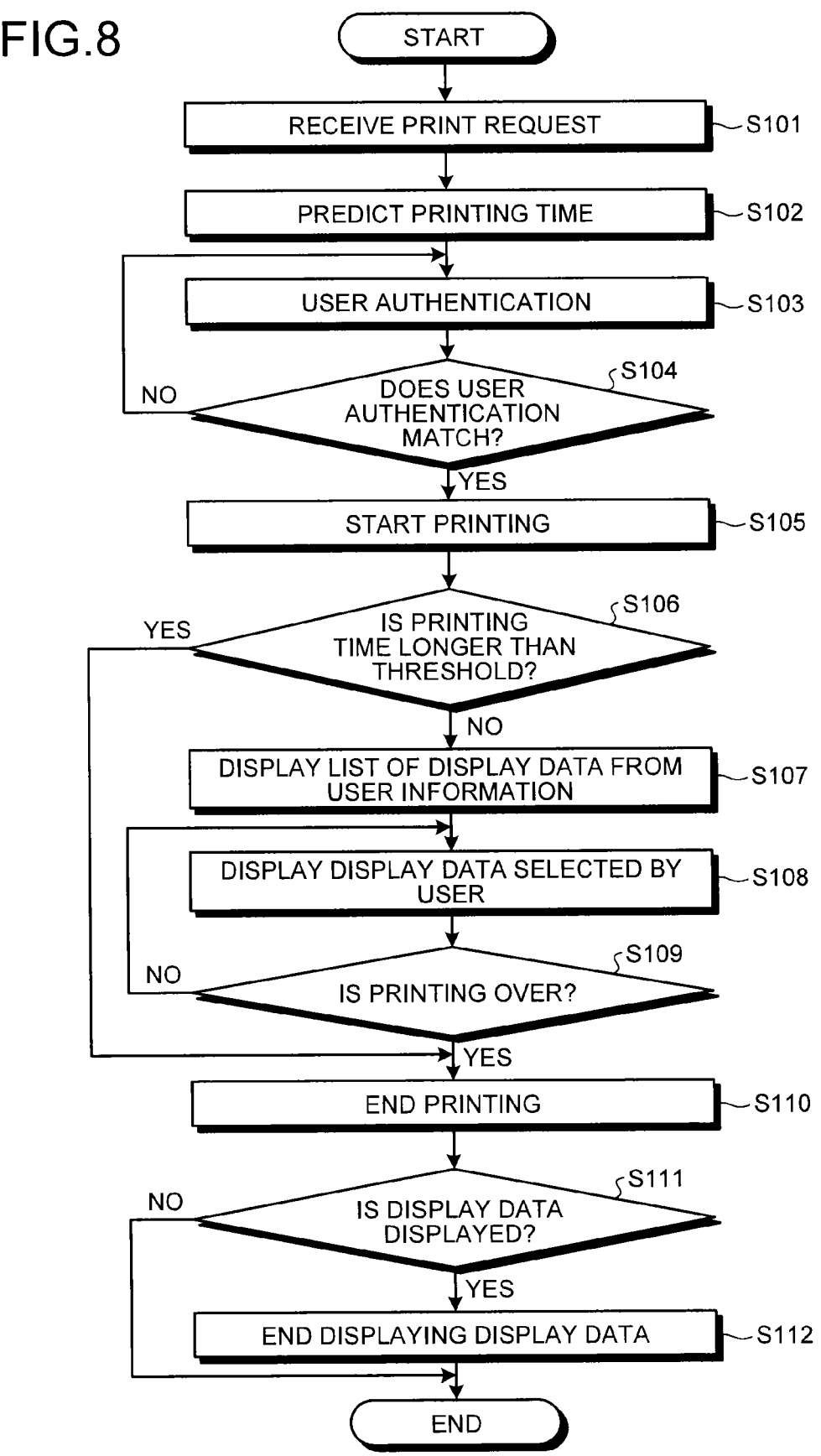
FIG. 8 is a flowchart illustrating print control processing accompanied by display control of display data.

In this state, as illustrated in FIG. 8, the image forming apparatus Gk performs print control processing accompanied by display control of display data. Note that in the following description, a case of performing print output as data output will be described. However, an application to data distribution output or the like is also possible.

In FIG. 8, when there is a print request, along with data to be output, from the host apparatuses Hs1 to Hsn or the input function unit 31, the image forming apparatus Gk receives the print request (step S101). When the image forming apparatus Gk receives the print request, the control function unit 33 makes the data output time calculation function unit 39 calculate a predicted printing time (predicted output time) through the data display control function unit 38 (step S102). The data output time calculation function unit 39 calculates a predicted printing time necessary for printing print data to be printed, for example, based on a continuous printing speed in one minute which is determined in advance for each type of the image forming apparatus Gk as a specification thereof.

Next, the control function unit 33 performs displaying, on the display function unit 32, to prompt an input of user authentication information. When user authentication information is input in response to the display (step S103), the control function unit 33 checks whether the input user authentication information matches user authentication information which is stored into the NVRAM 24 as illustrated in FIG. 4 (step S104).

When the input user authentication information does not match in step S104 (NO in step S104), the control function unit 33 goes back to step S103 and performs, in a manner similar to the above, the processing of performing displaying to prompt an input of user authentication information and the processing following the display processing (step S103 and step S104).

When the input user authentication information matches in step S104 (YES in step S104), the control function unit 33 makes the data output function unit 36 start printing (step S105). When the printing is started, the control function unit 33 checks whether a predicted printing time is longer than a threshold time set in advance (step S106). The threshold time is set previously as a predicted printing time, in which a user may move away from the image forming apparatus Gk while display data is displayed, and is stored into the NVRAM 24 or the like. That is, when the predicted printing time is longer than the threshold time, a user may move away from a vicinity of the image forming apparatus Gk. Thus, when display data is kept displayed, a third person may see the display data. Also, the threshold time is arbitrarily set and input by a user or by an administrator of the image forming apparatus Gk from the input function unit 31, the host apparatuses Hs1 to Hsn, a management apparatus KS, or the like and is stored into the storage function unit 37 in advance.

When the predicted printing time is shorter than the threshold time in step S106 (NO in step S106), the control function unit 33 makes the data acquisition function unit 35 acquire a list of display data from the storage function unit 37 and makes the display function unit 32 display the list of display data (step S107). In this case, the data acquisition function unit 35 refers to the association database illustrated in FIG. 7 and acquires, as the list of display data, a type of registration data and a data ID of display data related to a user, for example, based on the user information, such as a user ID, used in the user authentication. Moreover, based on a data ID and a type of registration data in FIG. 7, the data acquisition function unit 35 refers to the databases respectively illustrated in FIG. 5 and FIG. 6 and acquires the list of display data.

By an operation of the input function unit 31, that is, by a key operation on the operation panel 13 or a touch operation on the touch panel, the user selects display data to be displayed from the list of display data displayed on the display function unit 32, that is, on the display of the operation panel 13.

The control function unit 33 makes the data display control function unit 38 acquire, from storage function unit 37, the display data selected by the user and makes the display function unit 32 display the acquired data (step S108), and checks whether the printing is over (step S109).

When the printing is not over in step S109 (NO in step S109), the control function unit 33 goes back to step S108, keeps displaying the display data selected by the user, and repeats checking whether the printing is over (step S108 and step S109).

When the printing is over in step S109 (YES in step S109), the control function unit 33 ends the print processing which is by the data output function unit 36 (step S110) and checks whether display data is displayed (step S111).

Since the display data is currently displayed in step S111 (YES in step S111), the control function unit 33 ends displaying of the display data, which displaying is performed by the display function unit 32, and ends the print control processing accompanied by display control of the display data (step S112).

Also, when the predicted printing time is longer than the threshold time in step S106 (YES in step S106), the control function unit 33 determines that the user may move away from the image forming apparatus Gk and the display data may be seen by a third person when the display data is displayed. Thus, in this case, the control function unit 33 does not display the display data and makes the data output function unit 36 keep printing. When the printing over, the control function unit 33 ends the print processing (step S110) and determines whether the display data is displayed (step S111).

Since the display data is not currently displayed in step S111 (NO in step S111), the control function unit 33 end the print control processing accompanied by the display control of the display data.

In such a manner, the image forming apparatus Gk which is a data output apparatus of the data output system 1 of the present embodiment includes a data output function unit (data output unit) 36 configured to output data to be output in a specified output form, a data output time calculation function unit (output time calculation unit) 39 configured to calculate a predicted output time necessary for outputting the data to be output in the specified output form in the data output function unit 36, a storage function unit (storage unit) 37 which stores display data, a display function unit (display unit) 32 configured to perform display output of the display data in the storage function unit 37, and the control function unit 33 and the data display control function unit 38 each of which is a control unit configured to compare the predicted output time with a predetermined threshold time and is configured to control displaying of the display data onto the display function unit 32.

Thus, based on a predicted output time necessary for data output of data to be output in a specified output form, displaying of display data can be controlled and control such as stopping the displaying of the display data can be performed when the predicted output time is so long that a user may move away from the image forming apparatus Gk. As a result, it is possible to reduce possibility of leakage of personal information and to utilize a waiting time during data output.

Also, the data output system 1 of the present embodiment is a data output system including the image forming apparatus (data output apparatus) Gk configured to output data to be output in a specified output form, and a display function unit (display apparatus) 32 configured to perform display output of display data. The data output system 1 includes the data output time calculation function unit (output time calculation unit) 39 configured to calculate a predicted output time necessary for outputting the data to be output in the specified output form in the image forming apparatus Gk, the storage function unit (storage unit) 37 which stores the display data to be displayed by the display function unit 32, and the control function unit 33 and the data display control function unit 38 each of which is a control unit configured to compare the predicted output time with a predetermined threshold time and is configured to control displaying of the display data onto the display function unit 32.

Thus, in the data output system 1 configured to output data to be output in a specified output form, based on a predicted output time necessary for data output of the data to be output in the specified output form, displaying of display data can be controlled and control such as stopping the displaying of the display data can be performed when the predicted output time is so long that a user may move away from the image forming apparatus Gk. As a result, it is possible to reduce possibility of leakage of personal information and to utilize effectively a waiting time during data output.

Moreover, the data output system 1 of the present embodiment executes a data output control method. The method includes a data output processing step to output data to be output in a specified output form, an output time calculation processing step to calculate a predicted output time necessary for outputting the data to be output in the specified output form in the data output processing step, a display processing step to perform display output of the display data, which is stored in the storage function unit 37, onto the display function unit 32, and a display control processing step to compare the predicted output time with a predetermined threshold time and to control displaying of the display data in the display processing step.

Thus, based on a predicted output time necessary for data output of data to be output in a specified output form, displaying of display data can be controlled and control such as stopping the displaying of the display data can be performed when the predicted output time is so long that a user may move away from the image forming apparatus Gk. As a result, it is possible to reduce possibility of leakage of personal information and to utilize effectively a waiting time during data output.

Also, the data output system 1 of the present embodiment includes a data output control program which makes a control processor such as the CPU 21 execute data output processing to output data to be output in a specified output form, output time calculation processing to calculate a predicted output time necessary for outputting the data to be output in the specified output form in the data output processing step, display processing to perform display output of the display data, which is stored in the storage function unit 37, onto the display function unit 32, and display control processing to compare the predicted output time with a predetermined threshold time and to control displaying of the display data in the display processing step.

Thus, based on a predicted output time necessary for data output of data to be output in a specified output form, displaying of display data can be controlled and control such as stopping the displaying of the display data can be performed when the predicted output time is so long that a user may move away from the image forming apparatus Gk. As a result, it is possible to reduce possibility of leakage of personal information and to utilize effectively a waiting time during data output.

Moreover, the image forming apparatus Gk of the data output system 1 of the present embodiment further includes a time setting unit such as the input function unit 31 to set the threshold time.

Thus, according to an environment in which the image forming apparatus Gk is used, a threshold time can be appropriately set. Thus, it is possible to reduce possibility of leakage of personal information and to further improve usability.

Also, in the image forming apparatus Gk of the data output system 1 of the present embodiment, the data output time calculation function unit 39 calculates the predicted output time based on an output time for a unit data quantity in the specified output form in the data output function unit (data output unit) 36 and a quantity of the data to be output.

Accordingly, it is possible to calculate a predicted output time of data to be output accurately, and thus, it is possible to reduce possibility of leakage of personal information and to improve usability appropriately.

Second Embodiment

Figure 9:
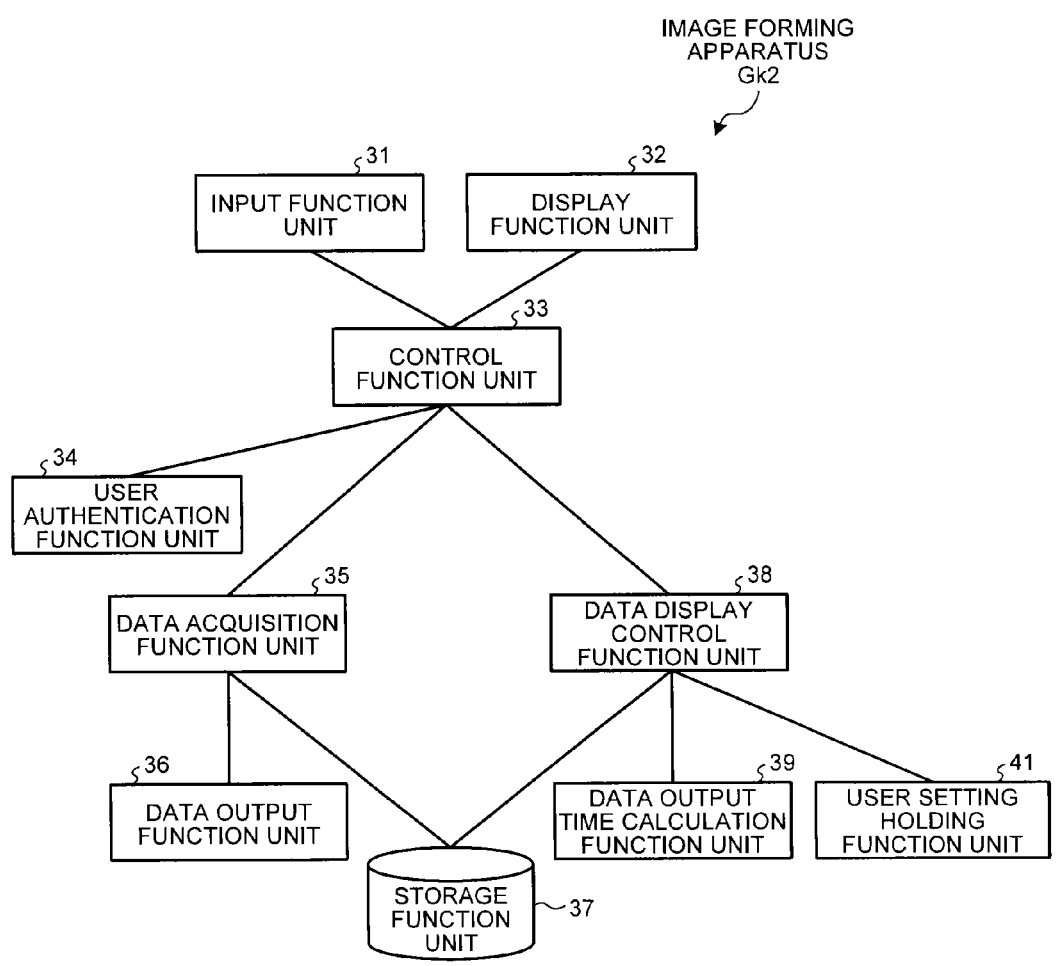
FIG. 9 is a functional block diagram illustrating an image forming apparatus of a second embodiment.
Figure 10:
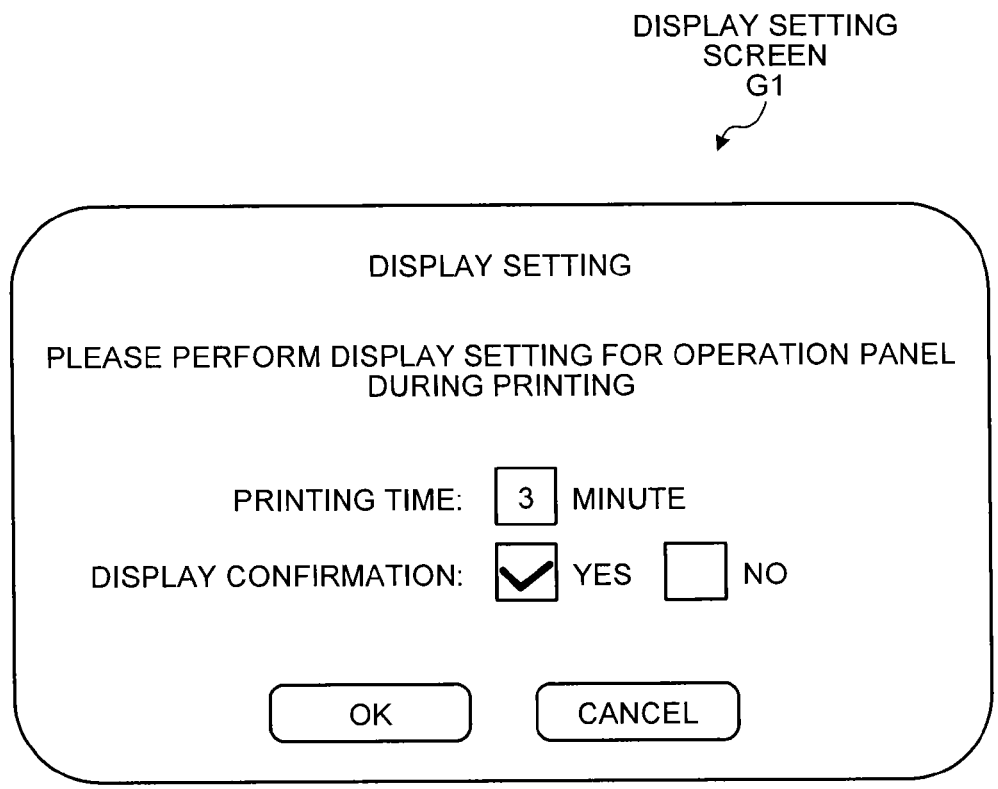
FIG. 10 is a view illustrating an example of a display setting screen.
Figure 11:
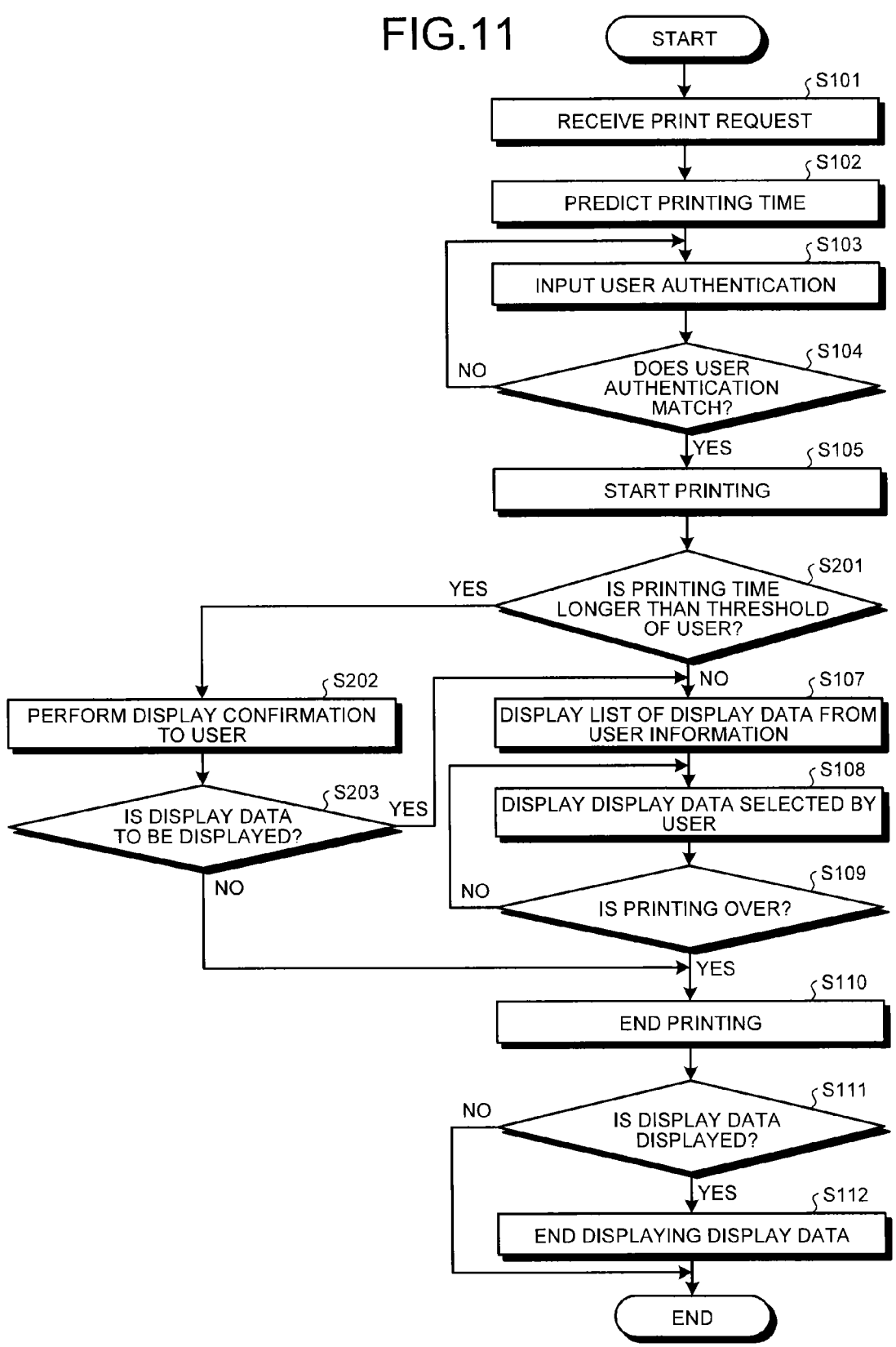
FIG. 11 is a flowchart illustrating print control processing accompanied by display control of display data according to the second embodiment.

FIG. 9 to FIG. 11 are charts illustrating a data output apparatus of the second embodiment of the present invention. FIG. 9 is a functional block diagram of an image forming apparatus Gk2 which is applied to a data output system to which the data output apparatus, the data output system, the data output control method, and the data output control program of the second embodiment of the present invention are applied.

Note that the present embodiment is applied to a data output system and an image forming apparatus similar to the data output system 1 and the image forming apparatus Gk of the first embodiment. In description of the present embodiment, to a configuration part similar to that of the first embodiment, the same reference sign is assigned and description of the part is simplified or omitted. Also, when necessary, a part which is not illustrated is described by using the reference sign used in the first embodiment.

The image forming apparatus Gk2 of the data output system 1 of the present embodiment sets and registers, for each user, a threshold time whether to display display data and performs, for each user, display control of the display data. Then, as the image forming apparatus Gk2 of the present embodiment, an image forming apparatus including a hardware configuration and a software configuration similar to those of the image forming apparatus Gk illustrated in FIG. 2 is used. In the image forming apparatus Gk2, a data output control program of the present embodiment is installed, whereby a functional block illustrated in FIG. 9 is built. In FIG. 9, in the image forming apparatus Gk2, an input function unit 31, a display function unit 32, a control function unit 33, a user authentication function unit 34, a data acquisition function unit 35, a data output function unit 36, a storage function unit 37, a data display control function unit 38, a data output time calculation function unit 39, and the like similar to those of the image forming apparatus Gk of the first embodiment are built and a user setting holding function unit 41 is also built.

The user setting holding function unit 41 is built, for example, to include an NVRAM 24 or a hard disk 25. Under control by the control function unit 33, a threshold time for each user, that is, a predicted printing time to be a determination reference, for each user, whether to display display data is registered into the user setting holding function unit 41. The threshold time is, for example, three minutes or five minutes. The threshold time for each user is input by a user or an administrator of the data output system 1 from the input function unit 31, host apparatuses Hs1 to Hsn, an administrator terminal, or the like. When the threshold time for each user is input, the control function unit 33 registers the threshold time into the user setting holding function unit 41 through the data display control function unit 38.

For example, when input of the threshold time for each user is performed on the input function unit 31, that is, on an operation panel 13, the control function unit 33 displays, on a display, a display setting screen G1 illustrated in FIG. 10. On the display setting screen G1 illustrated in FIG. 10, an item of "printing time" which is a threshold time, a setting item whether to perform display confirmation, and buttons of "OK" and "cancel" are displayed. Based on the display setting screen G1, a user sets a printing time (in FIG. 10, state in which "three minutes" is set is displayed) to be a threshold time and sets whether to perform display confirmation.

Then, as illustrated in FIG. 11, the image forming apparatus Gk2 of the present embodiment executes print control processing accompanied by display control of display data while a threshold time for each user is set and registered. Note that in FIG. 11, to a processing step similar to that in FIG. 8, the same step number is assigned and descriptions of the step is simplified.

That is, when the image forming apparatus Gk2 receives a print request (step S101), the control function unit 33 makes the data output time calculation function unit 39 calculate a predicted printing time through the data display control function unit 38 (step S102).

Next, when user authentication information is input (step S103), the control function unit 33 checks whether the user authentication information matches user authentication information stored in the NVRAM 24 in advance (step S104). When the user authentication information does not match in step S104, the control function unit 33 goes back to step S103 and performs, in a manner similar to the above, processing of performing displaying to prompt an input of user authentication information and the processing following the display processing (step S103 and step S104).

When the user authentication information matches in step S104, the control function unit 33 makes the data output function unit 36 start printing (step S105) and checks whether the predicted printing time is longer than the threshold time, for the user, stored in the user setting holding function unit 41 (step S201).

As described above, the threshold time for each user is input in advance and is stored in the user setting holding function unit 41 which is built, for example, by the NVRAM 24 or the hard disk 25.

When the predicted printing time is shorter than the threshold time for the user in step S201 (NO in step S201), similarly to the above, the control function unit 33 makes the display function unit 32 display a list of display data (step S107).

By an operation of the input function unit 31, that is, by a key operation on the operation panel 13 or a touch operation on a touch panel, the user selects display data to be displayed from the list of display data displayed on the display function unit 32, that is, on a display of the operation panel 13.

The control function unit 33 displays, on the display function unit 32, display data selected by the user (step S108) and checks whether the printing is over (step S109).

When the printing is not over in step S109, the control function unit 33 goes back to step S108, keeps displaying the display data selected by the user, and repeats checking whether the printing is over (step S108 and step S109).

When the printing is over in step S109, the control function unit 33 ends the print processing by the data output function unit 36 (step S110) and checks whether the display data is displayed (step S111).

Since the display data is currently displayed in step S111, the control function unit 33 ends displaying of the display data by the display function unit 32 and ends the print control processing accompanied by the display control of the display data (step S112).

When the predicted printing time is longer than the threshold time for the user in step S201 (YES in step S201), the control function unit 33 performs display confirmation to the user (step S202) and checks whether selection to display the display data is made (step S203).

When selection to display the display data is made in step S203 (YES in step S203), the control function unit 33 goes to step S107 and performs, in a manner similar to the above, the processing of displaying a list of display data from user information and the processing following the display processing (step S107 to step S112).

When selection not to display the display data is made in step S203 (NO in step S203), the control function unit 33 does not display the display data. The control function unit 33 makes the data output function unit 36 keep performing the printing and ends the print processing when the printing is over (step S110). Next, the control function unit 33 checks whether the display data is displayed (step S111). Since the display data is not currently displayed (No in step S111), the control function unit 33 ends the print control processing accompanied by the display control of the display data.

In such a manner, in the image forming apparatus Gk2 of the data output system 1 of the present embodiment, the input function unit 31 as the time setting unit can set the threshold time for each user who makes an output request of the data to be output, and the control function unit 33 as the display control unit compares the predicted output time with the threshold time corresponding to the user, who makes the output request of the data to be output, and controls displaying of the display data onto the display function unit 32.

Accordingly, it is possible to perform display control of display data by setting a threshold time suitable for usability such as usability of each user, and thus, it is possible to reduce possibility of leakage of personal information and to further improve usability.

Also, the image forming apparatus Gk2 of the data output system 1 of the present embodiment further includes a confirmation unit including, for example, the display function unit 32 and the input function unit 31 to perform information confirmation. When the predicted output time is longer than the threshold time, the control function unit 33 makes the confirmation unit perform confirmation whether to display the display data and makes the display function unit 32 display the display data only when it is confirmed by the confirmation unit that the display data is to be displayed.

Thus, even when the predicted output time is longer than the threshold time, it is possible to display display data according to permission by a user, whereby it is possible to reduce possibility of leakage of personal information and to further improve usability.

Third Embodiment

Figure 12:
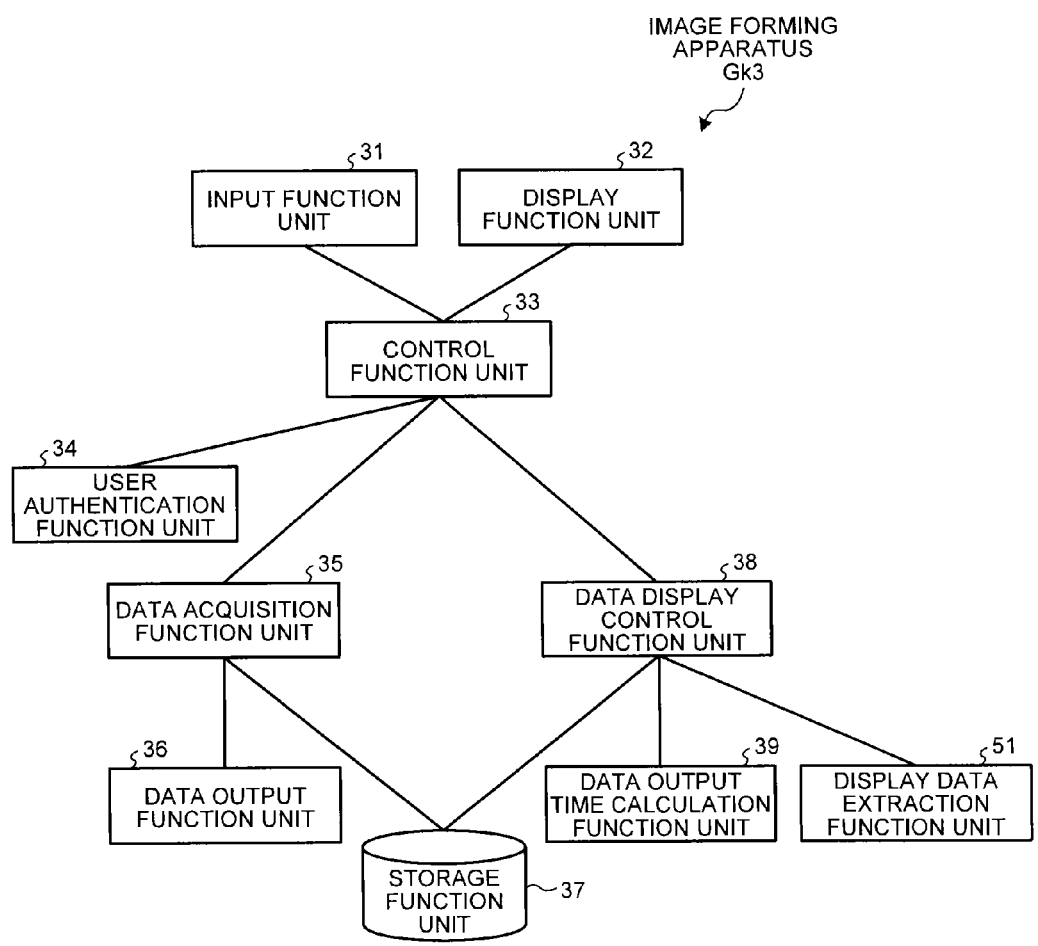
FIG. 12 is a functional block diagram of an image forming apparatus of a third embodiment.

FIG. 12 to FIG. 15 are charts illustrating a data output apparatus of a third embodiment of the present invention. FIG. 12 is a functional block diagram of an image forming apparatus Gk3 which is applied to a data output system to which the data output apparatus, the data output system, the data output control method, and the data output control program of the third embodiment of the present invention are applied.

Note that the present embodiment is applied to a data output system and an image forming apparatus similar to the data output system 1 and the image forming apparatus Gk of the first embodiment. In description of the present embodiment, to a configuration part similar to that of the first embodiment, the same reference sign is assigned and description of the part is simplified or omitted. Also, when necessary, a part which is not illustrated is described by using the reference sign used in the first embodiment.

When displaying display data, according to selection by a user, the image forming apparatus Gk3 of the data output system 1 of the present embodiment performs processing whether to display data related to personal information according to a display time.

Then, as the image forming apparatus Gk3 of the present embodiment, an image forming apparatus including a hardware configuration and a software configuration similar to those of the image forming apparatus Gk illustrated in FIG. 2 is used. In the image forming apparatus Gk3, a data output control program of the present embodiment is installed, whereby a functional block illustrated in FIG. 12 is built. In FIG. 12, in the image forming apparatus Gk3, an input function unit 31, a display function unit 32, a control function unit 33, a user authentication function unit 34, a data acquisition function unit 35, a data output function unit 36, a storage function unit 37, a data display control function unit 38, a data output time calculation function unit 39, and the like similar to those of the image forming apparatus Gk of the first embodiment are built and a display data extraction function unit 51 is also built.

Then, the storage function unit 37 stores, for example, an association database illustrated in FIG. 13 instead of the association database which associates a user and data and is illustrated in FIG. 7 of the first embodiment. As illustrated in FIG. 13, in the association database, data (user ID, kind of registration data, and data ID) in the association database in FIG. 7, and "no" (there is no personal information) and "yes" (there is personal information) which are identification information indicating whether there is personal information are registered.

Under control by the data display control function unit 38, the display data extraction function unit 51 extracts, among the display data stored in the storage function unit 37, display data to be displayed on the display function unit 32 according to an operation by a user and transmits the extracted display data to the data display control function unit 38. The operation by the user will be described later. Specifically, when the user performs an operation to permit displaying of personal information, the display data extraction function unit 51 extracts display data corresponding to an ID of the user as an object to be displayed regardless of whether either "no" or "yes" is registered in personal information in the association database. On the other hand, when the user performs an operation which does not permit displaying of personal information, the display data extraction function unit 51 extracts, as an object to be displayed, only display data which is registered in the association database as "no" indicating that the display data is not related to personal information and which corresponds to an ID of the user. Then, each of the input function unit 31 and the display function unit 32 functions as a confirmation unit to perform confirmation whether to display display data when the predicted output time is longer than the threshold time. That is, when the predicted output time is longer than the threshold time, as described later, the control function unit 38 displays, on the display function unit 32, display confirmation to ask whether to display the display data. By using the input function unit 31, a user makes selection, on the display of the display confirmation, whether to perform displaying.

Figure 14:
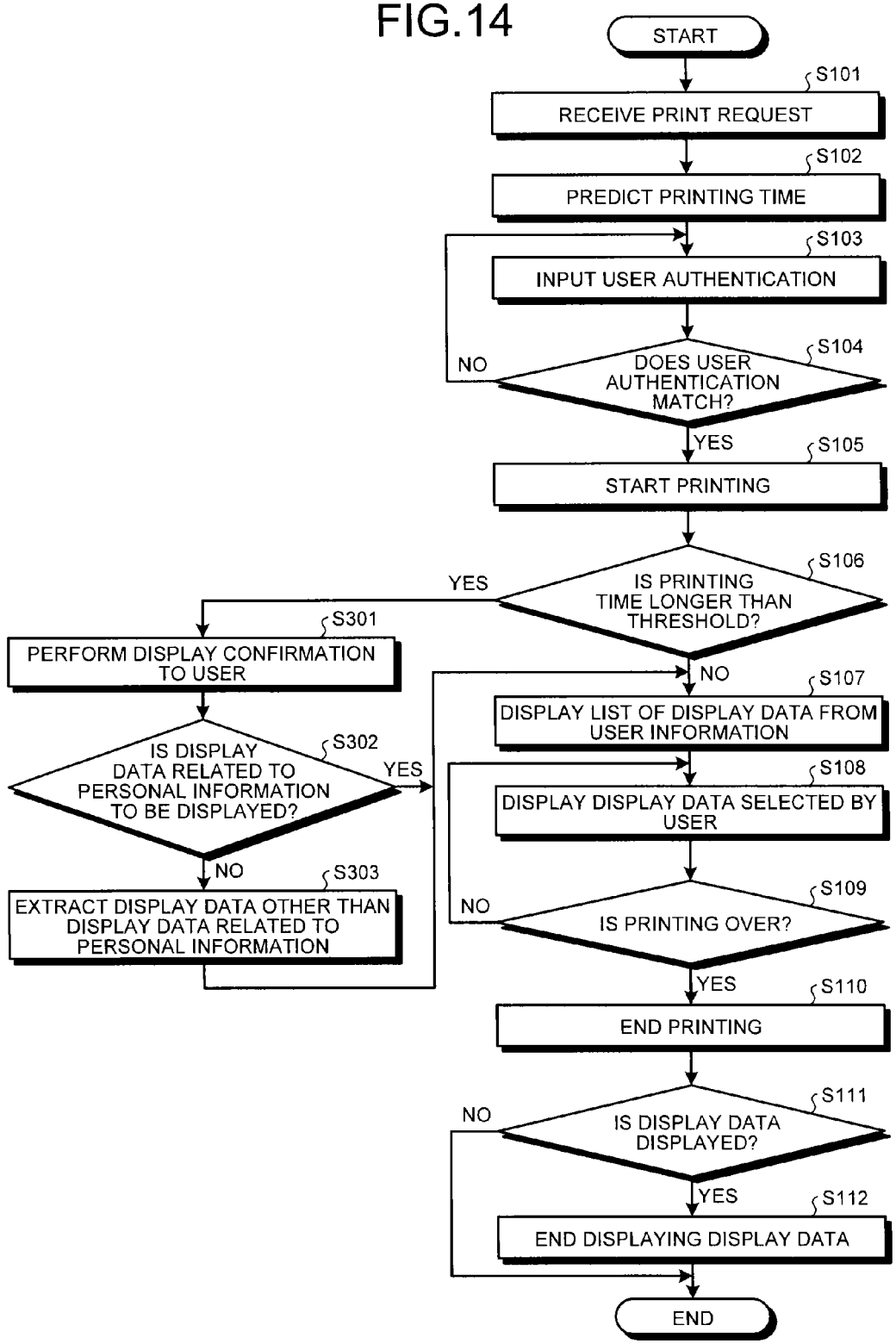
FIG. 14 is a flowchart illustrating print control processing accompanied by display control of display data according to the third embodiment.

Then, in a state which is illustrated in FIG. 13 and in which the association database is stored in the storage function unit 37, as illustrated in FIG. 14, the control function unit 33 executes print control processing accompanied by display control of display data. Note that in FIG. 14, to a processing step similar to that of FIG. 8, the same step number is assigned and description thereof is simplified.

That is, when the image forming apparatus Gk3 receives a print request (step S101), the control function unit 33 makes the data output time calculation function unit 39 calculate a predicted printing time through the data display control function unit 38 (step S102).

Next, when user authentication information is input (step S103), the control function unit 33 checks whether the user authentication information matches user authentication information stored in an NVRAM 24 in advance (step S104). When the user authentication information does not match in step S104, the control function unit 33 goes back to step S103 and performs, in a manner similar to the above, processing of performing displaying to prompt an input of user authentication information and the processing following the display processing (step S103 and step S104).

When the user authentication information matches in step S104, the control function unit 33 makes the data output function unit 36 start printing (step S105) and checks whether the predicted printing time is longer than a threshold time set in advance (step S106).

When the predicted printing time is shorter than the threshold time in step S106, the control function unit 33 makes the data acquisition function unit 35 acquire a list of display data from the storage function unit 37 and makes the display function unit 32 display the list of display data (step S107).

The control function unit 33 makes the display function unit 32 display display data selected by the user (step S108) and checks whether the printing is over (step S109).

When the printing is not over in step S109, the control function unit 33 goes back to step S108, keeps displaying the display data selected by the user, and repeats checking whether the printing is over (step S108 and step S109).

When the printing is over in step S109, the control function unit 33 ends the print processing by the data output function unit 36 (step S110) and checks whether the display data is displayed (step S111).

Since the display data is currently displayed in step S111, the control function unit 33 ends displaying of the display data by the display function unit 32 and ends the print control processing accompanied by the display control of the display data (step S112).

When the predicted printing time is longer than the threshold time in step S106, the control function unit 33 performs display confirmation to the user (step S301) and checks whether selection to display display data related to personal information is made (step S302).

Figure 15:
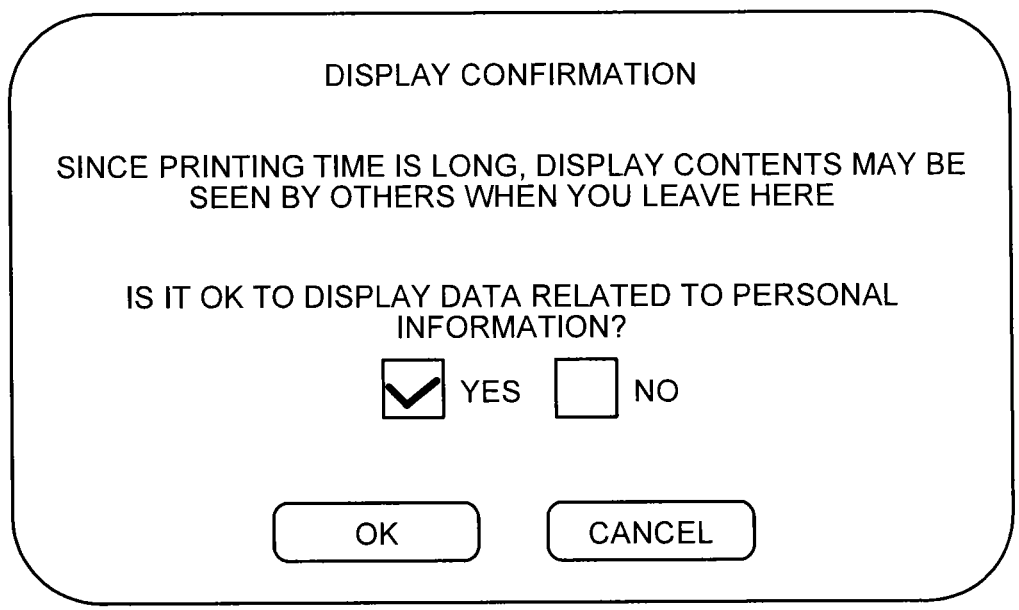
FIG. 15 is a view illustrating an example of display confirmation screen.

That is, for example, the control function unit 33 displays a display confirmation screen G2 illustrated in FIG. 15 onto the display function unit 32 and checks whether displaying of the display data related to personal information is permitted. On the display confirmation screen G2, selection boxes of "yes" and "no" to select whether it is okay to display the display data related to personal information and buttons of "OK" and "cancel" are displayed.

When selection to permit the displaying of the display data related to personal information is made in step S302 (YES in step S302), the control function unit 33 goes to step S107 and performs, in a manner similar to the above, processing of displaying a list of all pieces of display data from the user information and processing following the display processing (step S107 to step S112).

When selection not to permit the displaying of the display data related to personal information is made in step S302 (NO in step S302), the control function unit 33 makes the display data extraction function unit 51 extract display data other than the display data related to personal information (step S303).

The control function unit 33 goes to step S107, makes the data display control function unit 38 acquire, among the display data of the user which is stored in the storage function unit 37, a list of the extracted display data not related to personal information, and makes the display function unit 32 display the list of the display data (step S107). Hereinafter, similarly to the above, the control function unit 33 makes the display function unit 32 display display data selected by the user (step S108) and checks whether the printing is over (step S109). When the printing is not over in step S109, the control function unit 33 goes back to step S108, keeps displaying the display data selected by the user, and repeats checking whether the printing is over (step S108 and step S109). When the printing is over in step S109, the control function unit 33 ends the print processing by the data output function unit 36 (step S110) and checks whether the display data is displayed (step S111). Since the display data is currently displayed in step S111, the control function unit 33 ends displaying of the display data by the display function unit 32 and ends the print control processing accompanied by the display control of the display data (step S112).

In such a manner, in the image forming apparatus Gk3 of the data output system 1 of the present embodiment, the storage function unit 37 stores, for each piece of display data, identification information to identify whether the display data is related to personal information of a user. The image forming apparatus Gk3 includes a confirmation unit including the display function unit 32 and the input function unit 31 to perform the information confirmation, and the display data extraction function unit (extraction unit) 51 configured to extract, from the storage function unit 37, the display data not related to personal information based on the identification information. The control function unit 33 makes the confirmation unit perform confirmation whether to display the display data related to personal information when the predicted output time is longer than the threshold time, makes the display data extraction function unit 51 extract the display data not related to personal information when it is confirmed by the confirmation unit that displaying of the display data related to personal information is not permitted, and makes the display function unit 32 display only the extracted display data.

Thus, when the predicted output time is longer than the threshold time and the user may move away from the image forming apparatus Gk3, selection whether to display the display data related to personal information can be made and display data corresponding to the selection can be displayed. As a result, it is possible to reduce possibility of leakage of personal information and to further improve usability.

Also, the image forming apparatus Gk3 of the data output system 1 of the present embodiment includes the user authentication function unit (user information storage unit) 34 which stores user information of a user who permits an output request of the data to be output, and the input function unit (input unit) 31 configured to perform input of information. The storage function unit 37 stores the display data for each user. The control function unit 33 receives an output request of the data to be output from the user when user information input from the input function unit 31 matches the user information in the user authentication function unit 34, reads, from the storage function unit 37, the display data corresponding to the user information, and displays the read displayed data onto the display function unit 32.

Accordingly, it is possible to manage displaying of display data appropriately by using user authentication information, and thus, it is possible to reduce possibility of leakage of personal information and to further improve usability.

Note that in each of the above embodiments, a case where display output of display data is performed when each of the image forming apparatuses Gk, Gk2, and Gk3 performs print output of data to be output has been described. However, the display data is displayed not only in a case of performing print output of the data to be output. For example, display output of the display data may be performed when distribution output of the data to be output is performed. Also, in each of the above embodiments, a case where each of the image forming apparatuses Gk, Gk2, and Gk3 includes the display function unit 32, the control function unit 33, the storage function unit 37, the data display control function unit 38, the data output time calculation function unit 39, the user setting holding function unit 41, and the display data extraction function unit 51 has been described. However, it is not necessary for each of the image forming apparatuses Gk, Gk2, Gk3 to include all of the above function units. For example, one or more of the function units may be included in an apparatus on the network NW of the data output system 1 or a plurality of function units may be separately mounted to apparatuses on the network NW.

According to the present invention, it is possible to reduce possibility of leakage of personal information and to utilize a waiting time during data output.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data output apparatus comprising:
 a data output unit configured to output data to be output;
 an output time calculation unit configured to calculate a predicted output time necessary for outputting the data to be output;
 a storage unit which stores display data;
 a display unit configured to perform display output of the display data in the storage unit;
 an extraction unit configured to extract, from the storage unit, display data not related to personal information of a user based on identification information; and
 a display control unit configured to compare the predicted output time with a predetermined threshold time and to control displaying of the display data onto the display unit, wherein
 when the predicted output time is longer than the predetermined threshold time, the display control unit makes the display unit display only the extracted display data when displaying of the display data related to the personal information is confirmed to be not permitted.

2. The data output apparatus according to claim 1, further comprising a time setting unit configured to set the predetermined threshold time.

3. The data output apparatus according to claim 2, wherein
 the time setting unit can set the predetermined threshold time for each user who makes an output request of the data to be output, and
 the display control unit compares the predicted output time with the predetermined threshold time corresponding to the user, who makes the output request of the data to be output, and controls displaying of the display data onto the display unit.

4. The data output apparatus according to claim 1, wherein the output time calculation unit calculates the predicted output time based on an output time for a unit data quantity in a specified output form in the data output unit and based on a quantity of the data to be output.

5. The data output apparatus according to claim 1, further comprising a confirmation unit configured to perform information confirmation,
wherein, when the predicted output time is longer than the predetermined threshold time, the display control unit makes the confirmation unit perform the confirmation as to whether to display the display data.

6. The data output apparatus according to claim 1, wherein the storage unit stores, for each piece of the display data, the identification information to identify whether the display data is related to the personal information of the user,
the data output apparatus includes a confirmation unit configured to perform the confirmation and
when the predicted output time is longer than the predetermined threshold time, the display control unit makes the confirmation unit perform the confirmation as to whether to display the display data related to the personal information.

7. The data output apparatus according to claim 1, further comprising a user information storage unit configured to store user information of the user who permits an output request of the data to be output, and an input unit configured to input information, wherein
the storage unit stores the display data for each user, and
the display control unit receives the output request of the data to be output from the user when the user information input from the input unit matches the user information in the user information storage unit, reads the display data, which corresponds to the user information, from the storage unit, and displays the read display data onto the display unit.

8. A data output system including a data output apparatus configured to output data to be output and a display apparatus configured to perform display output of display data, the data output system comprising:
an output time calculation unit configured to calculate a predicted output time necessary for outputting the data to be output;
a storage unit which stores display data to be displayed by the display apparatus;
an extraction unit configured to extract, from the storage unit, display data not related to personal information of a user based on identification information; and
a display control unit configured to compare the predicted output time with a predetermined threshold time and to control displaying of the display data onto the display apparatus, wherein
when the predicted output time is longer than the predetermined threshold time, the display control unit makes the display unit display only the extracted display data when displaying of the display data related to the personal information is confirmed to be not permitted.

9. A data output control method, the method comprising:
outputting data to be output;
calculating a predicted output time necessary for the outputting of the data to be output;
displaying output of display data, which is stored in a storage unit, onto a display unit;
extracting, from the storage unit, display data not related to personal information of a user based on identification information; and
comparing the predicted output time with a predetermined threshold time and controlling displaying of the display data, wherein
when the predicted output time is longer than the predetermined threshold time, making the display unit display only the extracted display data when displaying of the display data related to the personal information is confirmed to be not permitted.

* * * * *